C. Perley.
Light & Air Ports.
Nº 10,157. Patented Oct. 25, 1853.
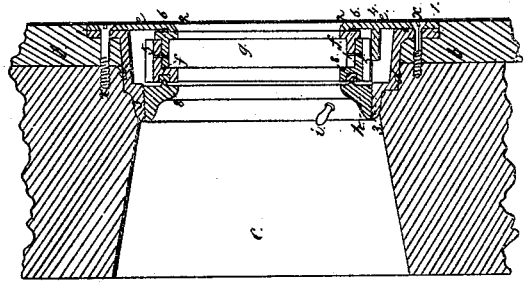
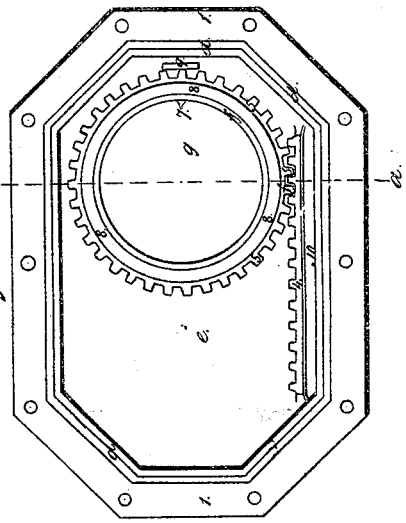
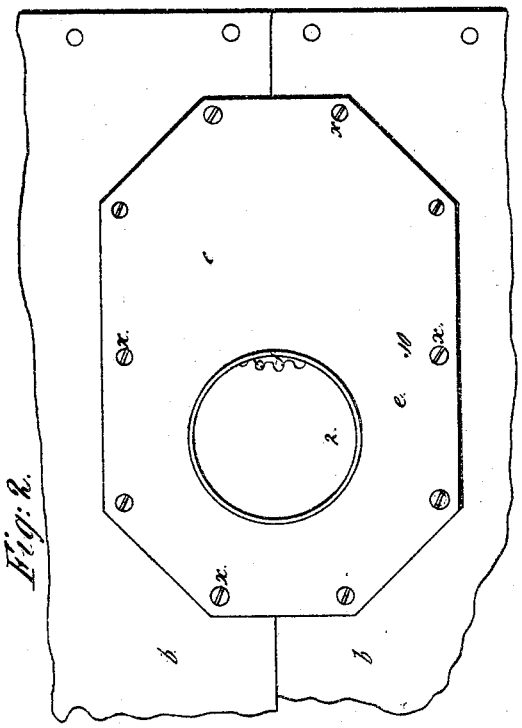
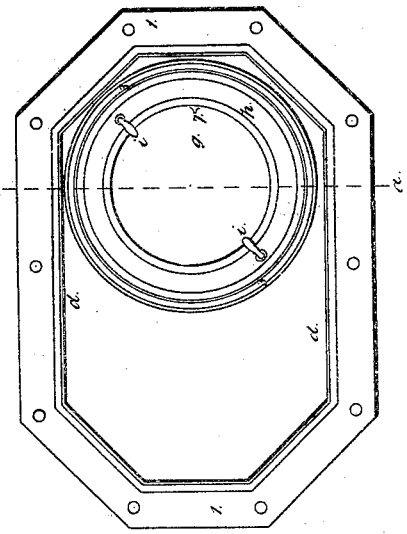
Witnesses.
Lemuel W. Serrell.
Thomas G. Harold.
Inventor.
Charles Perley

UNITED STATES PATENT OFFICE.

CHARLES PERLEY, OF NEW YORK, N. Y.

SHIP'S SIDE LIGHT.

Specification of Letters Patent No. 10,157, dated October 25, 1853.

*To all whom it may concern:*

Be it known that I, CHARLES PERLEY, of the city and State of New York, machinist, have invented, made, and applied to use certain new and useful Improvements in Side Lights for Ships and Vessels; and I do hereby declare that the following is a full, clear, and exact description of the construction and operation of the same, reference being had to the annexed drawing, making part of this specification, wherein—

Figure 1, is a view of the inner side of the light, Fig. 2, represents the outer side of the light as attached to the planking of a vessel, Fig. 3, is a section as with the inner plate removed, and Fig. 4, is a section at $a, a$, through the glass and box containing the same.

The like marks of reference designate the same parts.

The nature of my said invention consists in the use of a circular glass or light inclosed by a frame on which are cogs or teeth gearing into a fixed rack on the inside of a metal box that is let into the side of the vessel; to open the light it is rolled to one side within the box or case, and when it is to be closed the light is rolled back again and a screw ring forced onto an elastic packing in the frame of the glass makes a tight joint and any water that by accident may run into the box in which the light rolls can escape by a small opening left in the lower part for that purpose, thereby entirely preventing any leakage from entering the ship.

$b, b$, represents the planking of the vessel, $c$, the opening to pass the light as usual,— $d$, is a metal box having a flanch 1, around its edges and an opening 3, in one end thereof.

$e$, is a plate or cap, corresponding in size and shape with the flanch 1, and having an opening 2, in one end opposite the opening 3, but smaller in size. The box thus formed is to be let into the ship's side, with the plate $e$, flush with the surface of the vessel, and the opening 3, coinciding with the hole $c$, through the side of the vessel, and secured in place by screws $x$. On the inner surface of the cap $e$, is a rack 4, receiving the teeth 5, of the frame $f$, carrying the glass $g$, which glass is secured in place by the ring 6, (Fig. 4) and the position of the rack 4, is such that the inner edge of the ring 6, coincides with the opening 2, through the plate or cap $e$, and a block I prevents the glass and frame from rolling too far.

In Fig. 3, the glass and frame is shown as fitted to roll to the left, but the parts may be made so as to roll to the right if required.

7 is a small projection, which may be used, by which the glass and frame is made to turn, which turning, by means of the teeth gives the sidewise rolling motion.

By reference to Fig. 4, it will be seen that the size of the opening 3, is sufficient to pass the glass and frame, by which means a damaged glass may be removed; and the means which I use to secure the glass in place is a ring $h$, which is screwed into a flanch around the opening 3, and provided with a V on its inner side which takes an india rubber or other elastic packing 8, let into the inner surface of the frame $f$.

$i, i$, are handles by which the ring is screwed in to hold the glass or released to allow the glass to be rolled back, and when the light is open by screwing the ring into place it holds the glass from rolling about.

It will be seen that on forcing the ring $h$, against the elastic packing 8, the ring 6, is forced against the inner side of the plate $e$, and both parts being faced, form a tight joint, and should any leak occur the water merely passes into the box, and escapes by an opening or openings 10, through the plate $e$.

A square or oblong light may be fitted to move in the box instead of the rolling circular light, although I do not recommend the same.

What I desire to secure by Letters Patent is

1. I claim the box $d$, with its cap or plate $e$, to inclose the glass or light, and catch any leakage, passing the same out by a hole or holes 10, as described and shown.

2. I claim the circular light or glass fitted as shown to roll on the rack 4, by which means the light, is given a certain rolling motion from the circular motion communicated to it as specified.

3. I claim the screw ring $h$, and elastic packing 8, to make a tight joint to the light as described and shown.

In testimony whereof I have hereunto set my signature this third day of June one thousand eight hundred and fifty three.

CHARLES PERLEY.

Witnesses:
LEMUEL W. SERRELL,
THOMAS G. HAWLD.